United States Patent
Blanchette (10) Patent No.: US 7,658,844 B2
(45) Date of Patent: Feb. 9, 2010

(54) APPARATUS FOR SUPPORTING CHEMICAL TABLETS

(75) Inventor: David W. Blanchette, Bristol, CT (US)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 12/128,241

(22) Filed: May 28, 2008

(65) Prior Publication Data

US 2008/0296214 A1 Dec. 4, 2008

Related U.S. Application Data

(60) Provisional application No. 60/940,828, filed on May 30, 2007.

(51) Int. Cl.
*C02F 1/76* (2006.01)
*C02F 1/00* (2006.01)

(52) U.S. Cl. .................. 210/198.1; 210/167.11; 210/167.3; 210/206; 210/232; 422/263; 422/264; 422/266; 422/278

(58) Field of Classification Search .......... 210/167.1, 210/167.11, 167.3, 198.1, 205, 206, 209, 210/232; 422/255, 261, 263, 264, 266, 274, 422/275, 276, 277, 278; 137/268
See application file for complete search history.

(56) References Cited

U.S. PATENT DOCUMENTS

| | | | | |
|---|---|---|---|---|
| 6,077,484 A | * | 6/2000 | Graves | .................. 422/255 |
| 6,337,024 B1 | | 1/2002 | Hammonds | |
| 6,497,822 B2 | | 12/2002 | Blanchette | |

OTHER PUBLICATIONS

International Search Report in International Application No. PCT/US 08/06897.

* cited by examiner

*Primary Examiner*—Duane Smith
*Assistant Examiner*—Lucas Stelling
(74) *Attorney, Agent, or Firm*—Wiggin and Dana LLP

(57) ABSTRACT

A chemical feeder for dissolving chemical tablets includes a housing and a plurality of tapered pedestals positioned in the housing for supporting the chemical tablet as the tablet is dissolved by liquid flowing through the feeder. The housing also includes a cup configured to receive a cartridge for holding the tablet; the cup includes inlet and outlet ports for the liquid. The cartridge includes a plate at its lower end; the pedestals are formed on its interior surface. Each pedestal may have a pencil-point shape. When the chemical tablet is installed in the cartridge and the cartridge is installed in the cup, the tapered pedestals support the chemical tablet and thereby expose an underside of the tablet to the liquid. The tablet is immersed in the liquid according to the height of the pedestal; the dissolution rate of the tablet thus corresponds to the height of the pedestals.

18 Claims, 12 Drawing Sheets

APPARATUS FOR SUPPORTING CHEMICAL TABLETS

CROSS-REFERENCE TO RELATED APPLICATIONS

This application claims the benefit of U.S. Provisional Application No. 60/940,828, filed May 30, 2007.

FIELD OF THE DISCLOSURE

This disclosure generally relates to a device for introducing a chemical into a liquid. In particular, an apparatus is disclosed for supporting chemical tablets while they are dissolving into a liquid.

BACKGROUND OF THE DISCLOSURE

Water treatment systems, particularly swimming pool chlorinators, often employ chemical tablets that slowly dissolve while partially immersed in a flow of water. The chamber enclosing and supporting the tablet should be constructed so that the tablet dissolves completely and at a controllable rate.

U.S. Pat. No. 5,743,287, which issued to George P. Rauchwerger on Apr. 28, 1998, is directed to a swimming pool chlorinator that has a flow pipe that is removably attached to the inlet jet pipe from the pool circulation system and a container for chlorine-containing tablets that is located above the flow pipe. The chlorinator is submerged and the container has an opening to allow water from the pool to flow into the container and dissolve the tablets. A duct from the bottom of the container leads to the interior of the flow pipe. The duct extends into the flow pipe to constrict the flow through the pipe, so that this flow causes chlorinated solution to be aspirated from the container into the flow by means of the Venturi effect. The container is transparent so that the chlorine tablets are visible from outside the container. The container further has a removable lid for refilling the container. The container opening comprises a slotted hole in the lid, with a sliding plate that can be moved over this slot to vary the size of the opening and thereby regulate the flow through the container. The flow pipe has a knurled end that is inserted in the inlet jet pipe, so that the inlet jet pipe supports the chlorinator and the entire assembly may be removed from the pool for refilling.

U.S. Pat. No. 6,221,244, which issued to Ihssan F. Yassin on Apr. 24, 2001, is directed to a swimming pool chlorinator that utilizes a cylindrical housing that has an internal chamber. Within the internal chamber is concentrically mounted in a close fitting manner a valve member. The sidewall of the housing has a series of elongated slits and also the valve member has a series of similar elongated slits. The housing has mounted thereon at least one suction cup with the suction cup to be securable to a swimming pool wall surface or other surfaces associated with a swimming pool and beneath the surface of the water in the pool. Within the internal chamber of the housing is located one or more chlorine tablets. The valve member is to be adjusted relative to the housing so that the slits of the housing are unrestricted permitting free flow of water through the housing or the slits are restricted partially thereby limiting the amount of flow of water through the internal chamber. As the water is conducted through the internal chamber, the chlorine tablet is dissolved within the water, which chlorinates the water of the swimming pool when this water is conducted exteriorly of the housing.

U.S. Pat. No. 6,337,024, which issued to Carl L. Hammonds on Jan. 8, 2002, is directed to an apparatus and method for dissolving chemical tablets for creating a variable rate of chemical dissolution in a stream of constant flow rate of untreated liquid, especially water. The apparatus includes a housing in which a container is placed. The container includes a sieve plate or perforated grid, which separates the container into an upper chamber in which chemical tablets are stored and a lower mixing chamber. A collection reservoir is defined in an annular outside the container wall and inside of the housing. Several arrangements are illustrated by which a vortex of liquid is generated of controllable variable intensity in the lower or mixing chamber thereby creating uneven liquid pressure beneath the perforated grid as a function of radial distance. As a result, fluid passes aggressively through outer radial perforations or holes in the grid that impinge on the chemical tablets stacked on the grid. The liquid circulates in the upper chamber from the outward radial position toward the center of the grid plate, while eroding the tablets, and returns to the mixing chamber. A portion of the liquid exits into the collection reservoir. Liquid communication also exits from a hole in the bottom of the lower mixing chamber, which is open to the collection reservoir. Varying the intensity of the vortex varies the rate of chemical dissolution, yet the flow rate of liquid through the apparatus is constant.

U.S. Pat. No. 6,413,416, which issued to Leon Buchan on Jul. 2, 2002, is directed to a water treatment apparatus including a water treatment vessel providing a water treatment zone, which, in use, will contain a volume of water to be treated. A water inlet leads into the vessel, with a water outlet leading from the vessel. A cartridge holder for holding a water treatment cartridge containing a water treatment substance for treating water in the vessel, and a controller for controlling the level of water in the vessel, are also provided.

SUMMARY OF THE DISCLOSURE

A chemical feeder for dissolving chemical tablets in a liquid is disclosed. The chemical feeder includes a housing and a plurality of tapered pedestals positioned in the housing for supporting the chemical tablet as the tablet is dissolved by liquid flowing through the feeder. The housing also includes a cup configured to receive a cartridge for holding the chemical tablet; the cup includes an inlet port and an outlet port for the liquid.

In accordance with a first aspect of the disclosure, the cartridge has an upper end and an opposing lower end for contacting the cup, and a sidewall with an opening therein adjacent the lower end. The cartridge includes a plate disposed at the lower end; the plate has an exterior surface and an interior surface, and the plate has the tapered pedestals formed on its interior surface. Each of the tapered pedestals may have a pencil-point shape. When the chemical tablet is installed in the cartridge and the cartridge is installed in the cup, the tapered pedestals are effective to support the chemical tablet and thereby expose an underside of the chemical tablet to the liquid.

In accordance with a second aspect of the disclosure, the tapered pedestals are disposed in the cup and extend from an interior surface thereof. The cartridge has an upper end and an opposing lower end for contacting the cup, and a sidewall with an opening therein adjacent the lower end. The cartridge includes a grid portion, having support members, disposed at the lower end. The cup has a raised area with recesses therein; the tapered pedestals are disposed on the raised area so that, when the chemical tablet is installed in the cartridge and the cartridge is installed in the cup, the lower end of the cartridge surrounds the raised area and the support members are positioned within the recesses. The tapered pedestals are effective to support the chemical tablet and thereby expose an underside of the chemical tablet to the liquid. Each of the tapered pedestals may have a pencil-point shape.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings.

DETAILED DESCRIPTION

Figure 1:
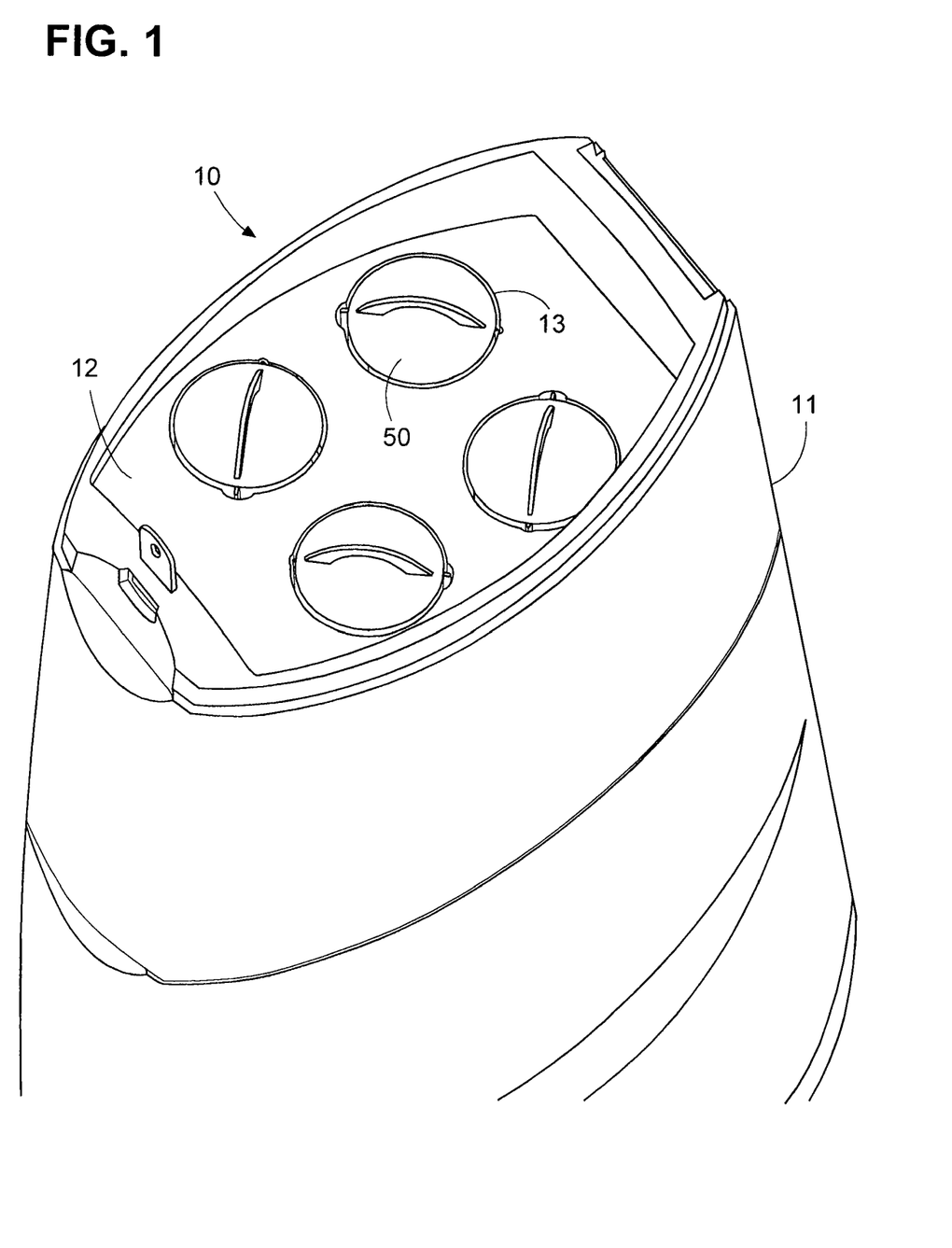
FIG. 1 illustrates the exterior of an apparatus with four cartridges for holding and supporting chemical tablets, in accordance with a first embodiment of the disclosure.

In a first embodiment, illustrated in FIGS. 1-6, an apparatus for holding and supporting chemical tablets includes support structures for the chemical tablets mounted in cartridges which are loaded into a housing. FIG. 1 illustrates an apparatus 10 configured to hold four cartridges 50. The apparatus has a housing 11 including a top cover (not shown). A cartridge support 12 is located beneath the top cover. The cartridge support has openings 13 therein, through which the cartridges are installed.

Figure 2:
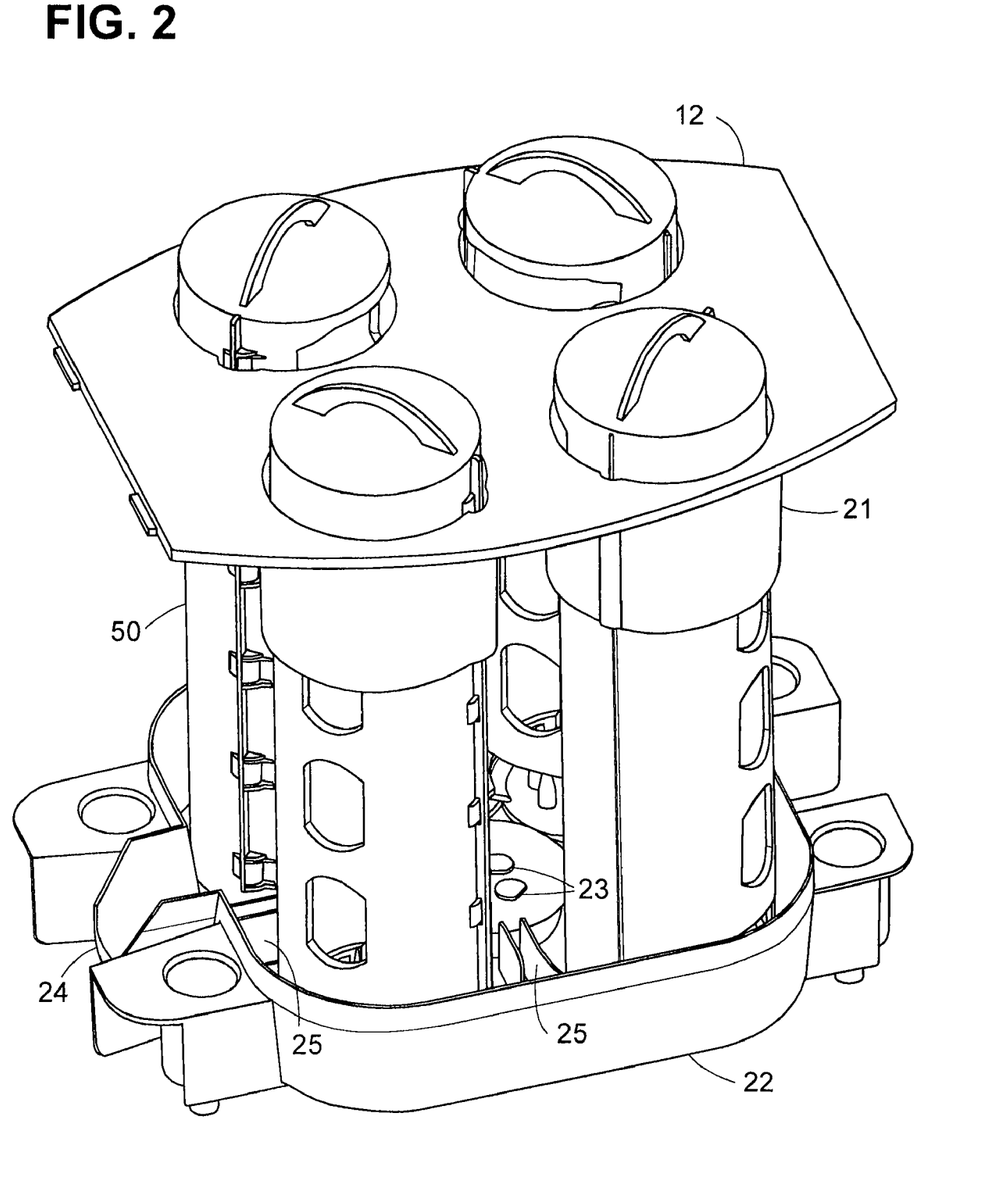
FIG. 2 is a partially exploded view of the apparatus of FIG. 1, showing the interior thereof.

FIG. 2 is a partially exploded view showing the interior of the apparatus according to this embodiment. The cartridge support 12 has collars 21 extending downward to guide the cartridges as they are installed through the respective openings. The cartridges stand in a dissolving cup 22 adjacent to the bottom of the housing. When the apparatus is in operation, water enters the cup through nozzles (beneath nozzle caps 23) in a nozzle assembly (partially shown in FIG. 2), and is conducted away via spout 24. The dissolving cup has partitions 25 formed therein, forming subchambers and channels to direct and maintain water flow from the nozzles so that water contacts the chemical tablet uniformly.

Figure 3:
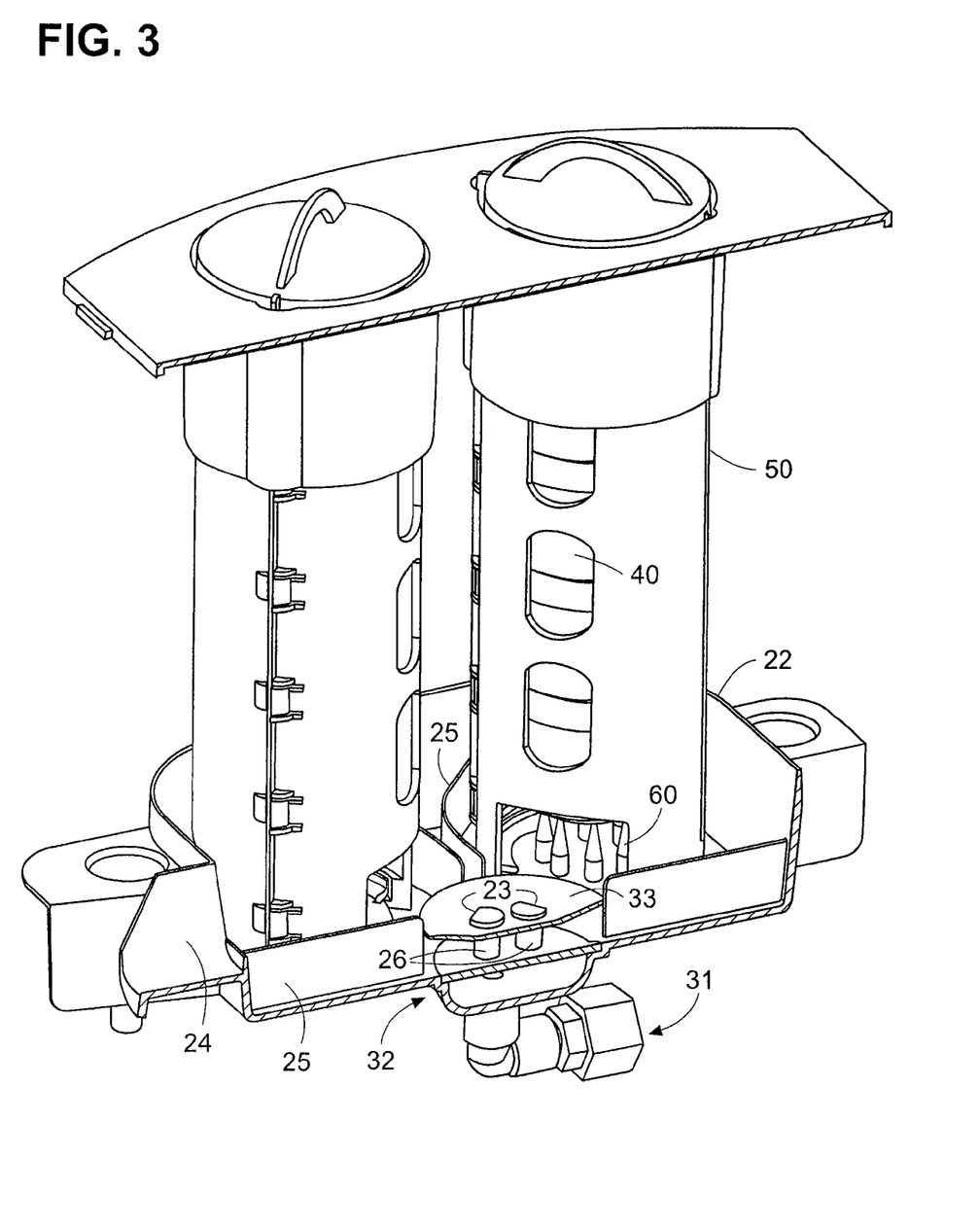
FIG. 3 is a sectional view of the interior of the apparatus of FIG. 2.

FIG. 3 is a sectional view showing half of dissolving cup 22 with two cartridges 50 installed therein. As shown in FIG. 3, a cartridge may have a plurality of chemical tablets 40 placed therein, in a vertical stack. The lowest tablet is supported on a plurality of tapered pedestals 60, and is in contact with the water flowing through the dissolving cup. Water enters the dissolving cup from inlet 31 through nozzle assembly 32. The nozzle assembly includes nozzles 26 (two shown in FIG. 3) and a deflector 33. The width of spout 24 and rate of water flowing into the inlet controls the level of water in the dissolving cup. As flow is increased, the water level in the dissolving cup increases. As the water level rises in the dissolving cup, the amount of the surface area of the chemical tablets that is contacted by the water increases.

The nozzles are generally oriented so that the water exits them at an angle substantially perpendicular to the housing sidewalls. Deflector 33 is positioned around and on top of the nozzles 26 to deflect water exiting the nozzles toward the underside of the deflector and upwardly toward the underside of the chemical tablets 40. The deflector has an upwardly sloped wall so that the water exiting the nozzles is deflected upwardly along the underside of the deflector toward the bottom of the chemical tablets. In an embodiment, the deflector is positioned over the nozzles, and the nozzles are located beneath nozzle caps 23 formed in the surface of the deflector. The tops of the nozzles may then be adhered to the nozzle caps of the deflector. The deflector prevents the water from the nozzle from rising too quickly and contacting the side of the chemical tablet, which would cause the tablet to tip forward. The deflector thus promotes even dissolving at the bottom of the chemical tablet.

Figure 4:
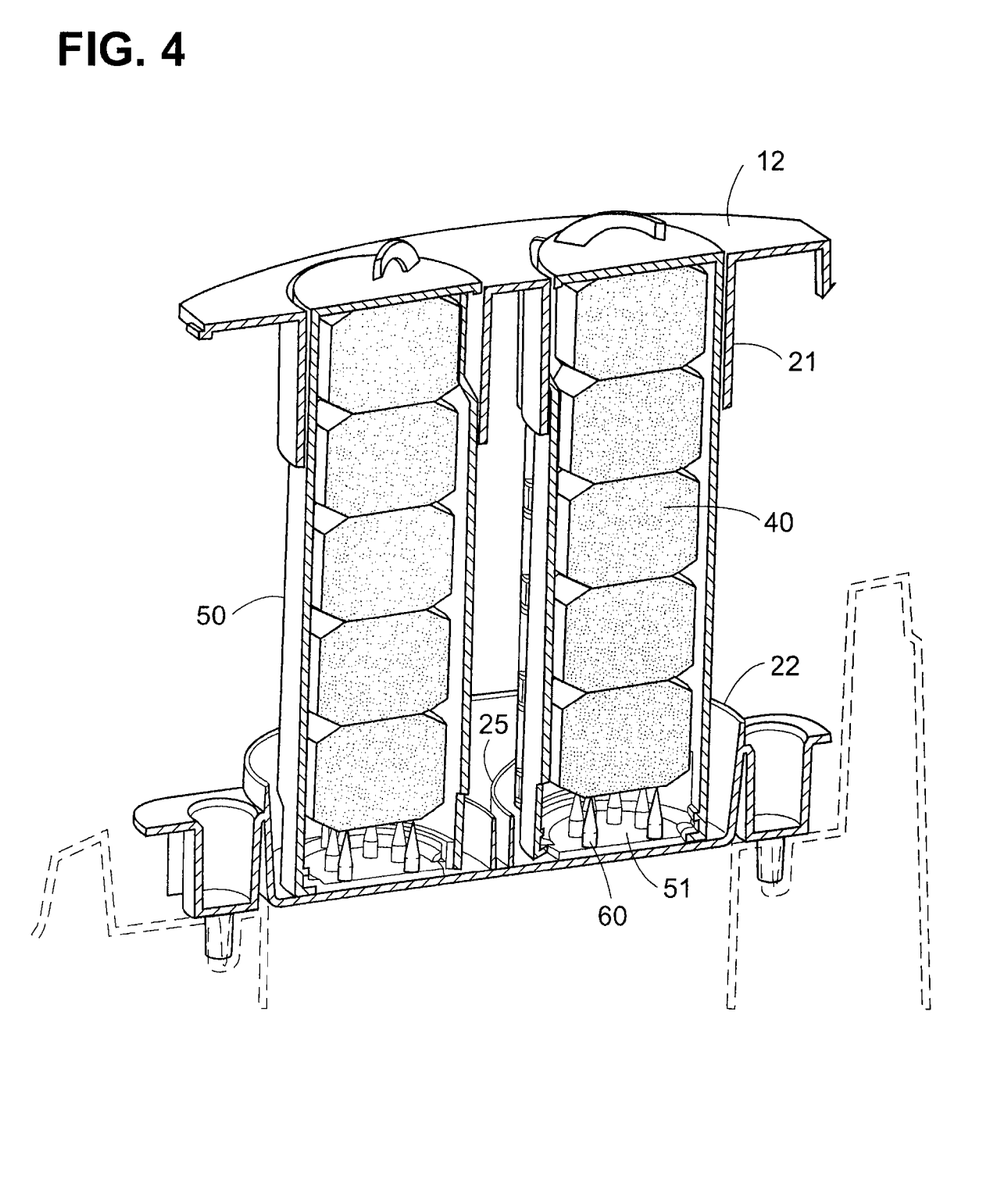
FIG. 4 is a further sectional view of the cartridges shown in FIG. 3, showing how chemical tablets may be installed and supported in the cartridges.

FIG. 4 is a further sectional view showing chemical tablets 40 loaded into two cartridges 50. Each cartridge stands in a separate subchamber, formed by partitions 25, of the dissolving cup 22. The upper end of each cartridge is enclosed by a collar 21 extending downward from the cartridge support 12. In each cartridge, the bottom tablet rests on a plurality of pencil point-shaped pedestals 60 extending upwardly (that is, toward the top of the housing). The pedestals are formed on a plate 51 at the bottom end of the cartridge. The pencil point-shaped pedestals are positioned to support the chemical tablets. The pointed shape of the pedestals minimizes the amount of surface area contacting the chemical tablets. By minimizing the surface area, the formation of chemical tablet columns during dissolution of the tablets is prevented and more uniform dissolution of the tablets is promoted.

Figure 5:
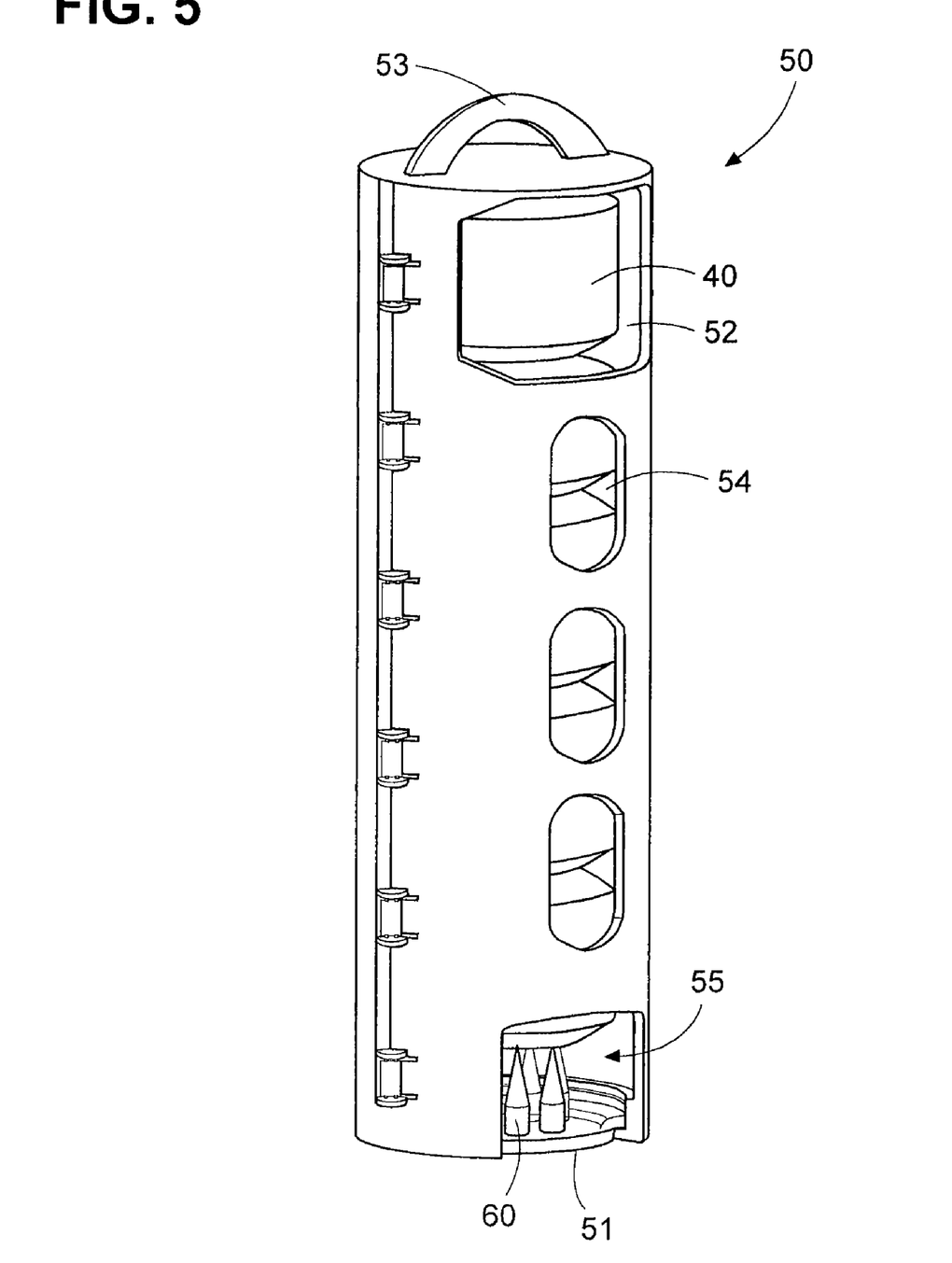
FIG. 5 illustrates a cartridge for holding chemical tablets, in accordance with the first embodiment of the disclosure.

FIG. 5 illustrates a cartridge 50 used in the apparatus 10 according to this embodiment. Plate 51, forming the bottom end of the cartridge, has pedestals 60 formed integrally therewith and pointing upward into the interior of the cartridge. In this embodiment, plate 51 is removable from the cartridge; since it is in contact with both the tablets and dissolving cup during use, the plate is subject to wear, and may be easily replaced. A plate may also be replaced with another plate having pedestals of a different height, thereby changing the dissolution rate of the tablets (as discussed further below).

The cartridge has an opening 52 through which the tablets are loaded. The size and shape of the opening 52 may be tailored so that the cartridge accepts only a specific type of tablet; this helps to ensure that an appropriate chemical product is used in the apparatus. The cartridge may also include handle 53 at its upper end. The upper end of the cartridge is typically supported by the cartridge support collar 21 when the cartridge is positioned in one of the subchambers. The sidewall of the cartridge has openings or slots 54, 55 therein.

Openings 54 permit alignment of the tablets so that they are stacked uniformly in the cartridge. Opening 55 allows water to contact the chemical tablet in contact with the pedestals.

Figure 6:
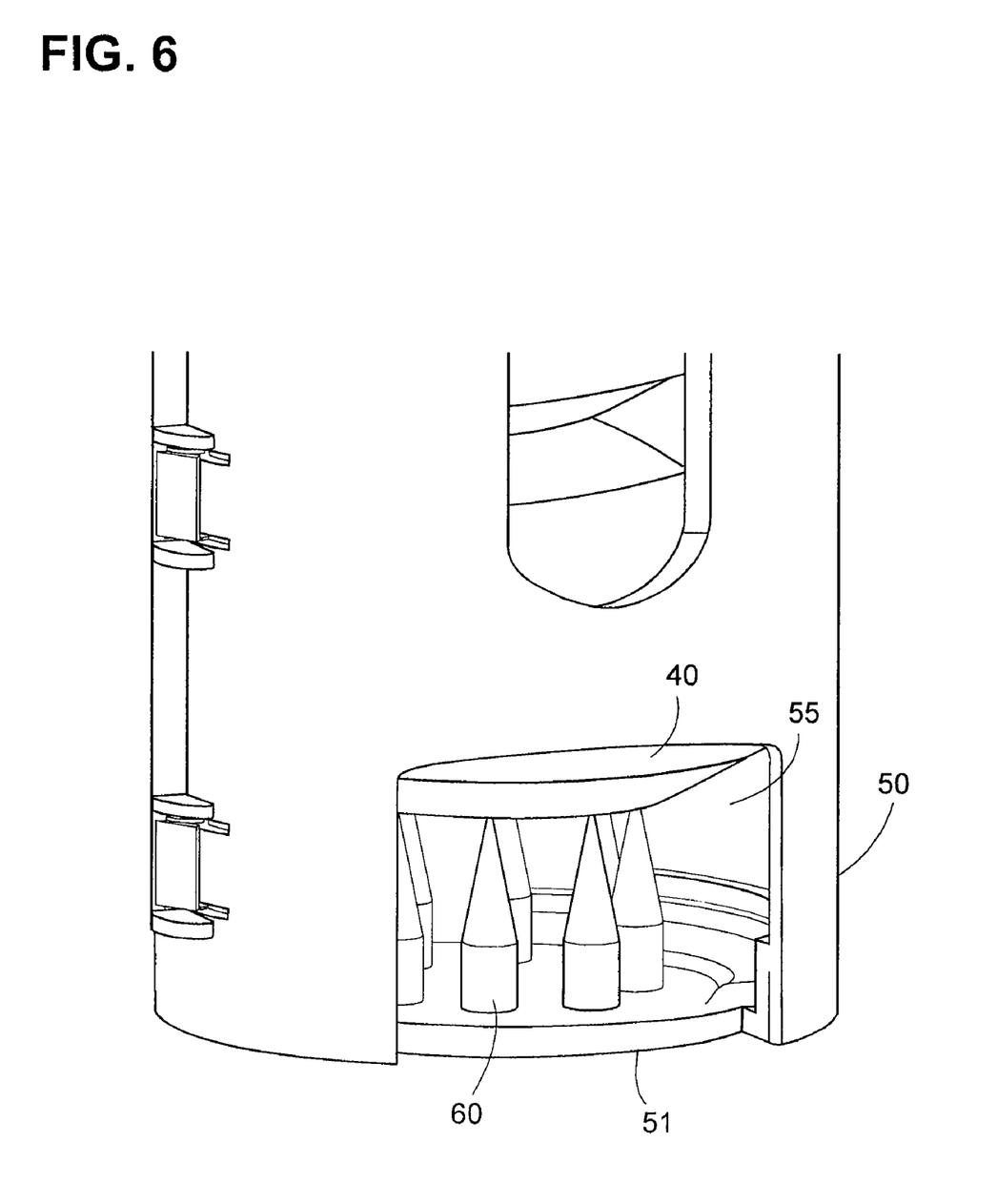
FIG. 6 is a detail view of FIG. 5, showing the supports for the chemical tablets in accordance with the first embodiment of the disclosure.

FIG. 6 is a detail view of FIG. 5, showing the tapered (pencil-point shaped) pedestals 60 formed on plate 51, installed at the lower end of cartridge 50. When the cartridge, holding chemical tablet 40, is installed in the dissolving cup, water entering the cartridge through opening 55 contacts the underside of the tablet. The pencil-point shaped pedestals contact the tablet with minimal surface area. The small surface area supporting the chemical tablets decreases the likelihood of undesirable pillar formation (where columns or pillars of undissolved tablets remain on the pedestal). In addition, the feed rate of the chemical is increased because the tablet dissolves faster when it is not supported above the water line by pillars. A secondary result is that the other chemical tablets are less prone to swelling, because they are not fed moisture via the pillars and do not remain in the chemical feeder long enough to swell.

As shown in FIGS. 4-6, the lowest tablet is supported at a height above the plate 51 corresponding to the height of pedestals 60. At a given depth of liquid in the dissolving cup 22, a chemical tablet supported at a lower height will be immersed to a greater extent and thus will dissolve at a faster rate. Accordingly, the rate of delivery of chemical product to the treatment system may be adjusted by changing the height of the pedestals. In this embodiment, this may easily be accomplished by substituting one plate 51 for another in the cartridge, where the new plate has pedestals with a height different from the previous plate.

In a second embodiment, illustrated in FIGS. 7-12, an apparatus for holding and supporting chemical tablets includes support structures for the chemical tablets formed in the dissolving cup adjacent the bottom of the housing.

Figure 7:
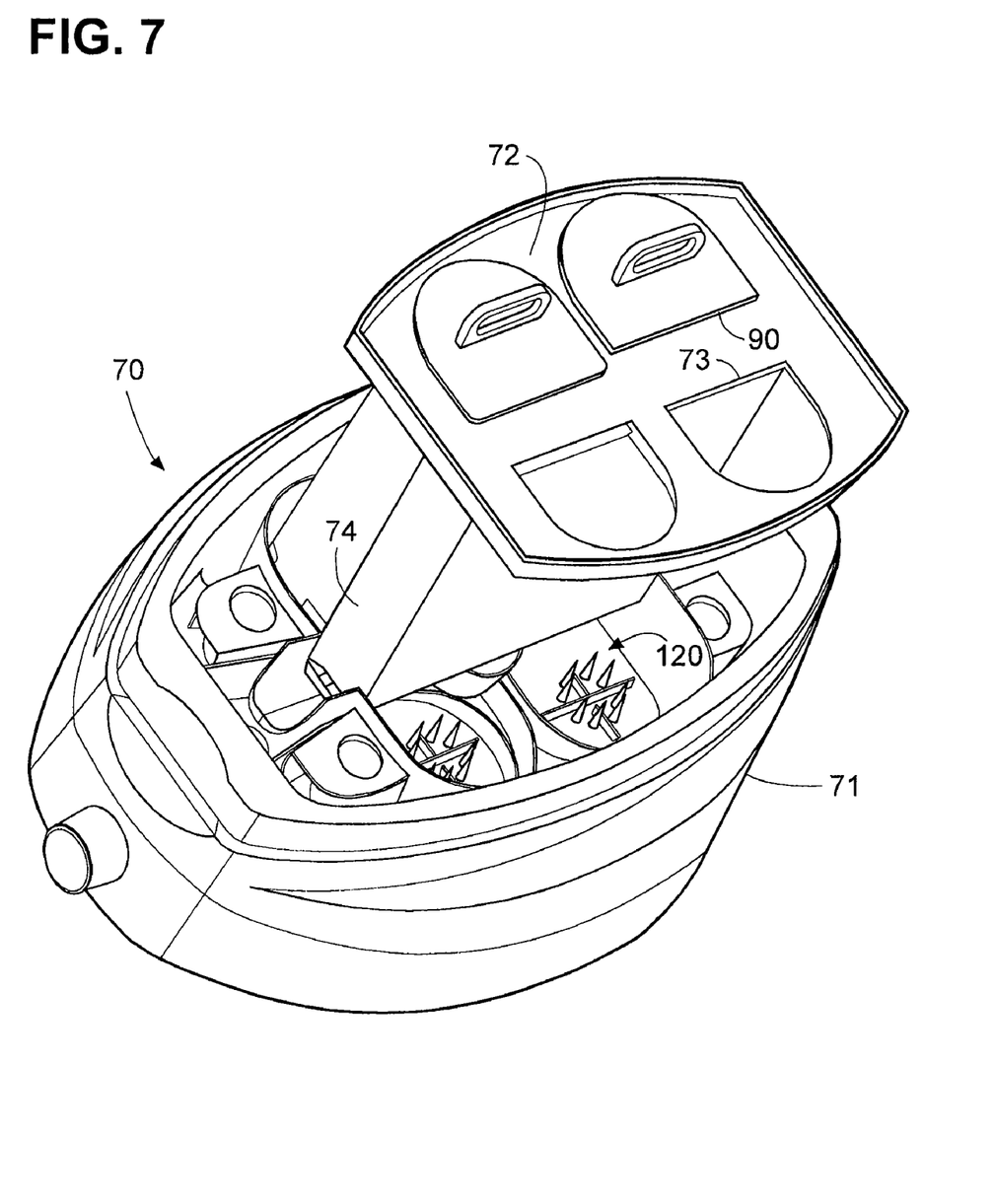
FIG. 7 is a partially exploded view of an apparatus for holding and supporting chemical tablets, in accordance with a second embodiment of the disclosure.

FIG. 7 is a partially exploded view of a chemical feeder 70 for dissolving chemical tablets in a liquid, according to this embodiment. The chemical feeder has a housing 71 similar to the first embodiment. The housing defines a chamber that is sized to hold the chemical tablets. The housing includes an inlet and an outlet for allowing liquid to enter and exit the housing. A partition 74 defines a plurality of subchambers within the chamber. A cartridge support 72 includes a plurality of cartridge openings 73, through which cartridges 90 may be inserted. In this embodiment, the plate at the upper end of the cartridge 90 is larger than the opening 73, so that the cartridge may be inserted until the upper end plate thereof contacts support 72, as shown in FIG. 7.

Figure 8:
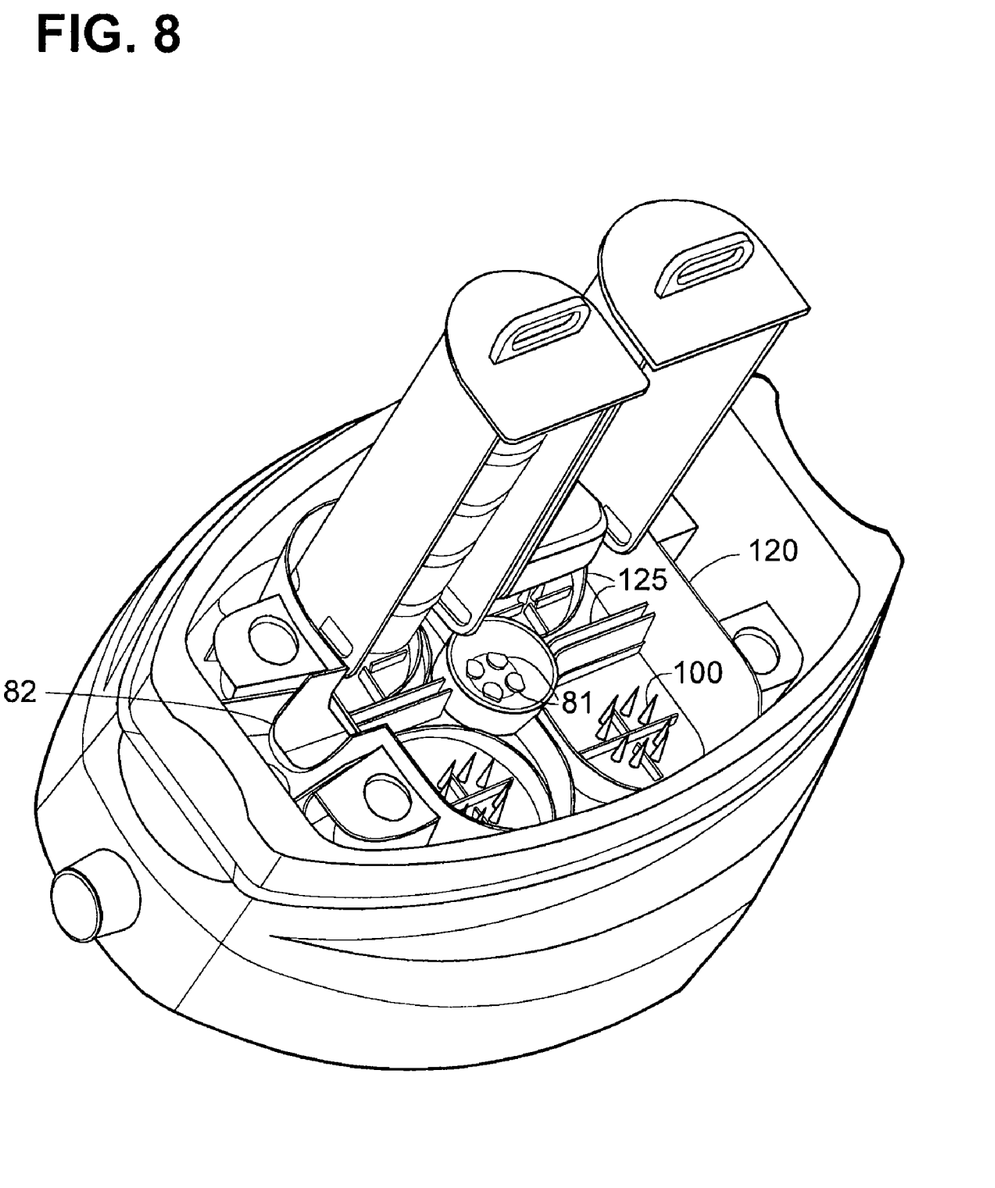
FIG. 8 is a further exploded view of the apparatus shown in FIG. 7, showing details of the cartridges and dissolving cup according to the second embodiment of the disclosure.

A dissolving cup 120 is positioned adjacent the bottom of the housing. FIG. 8 is a further partially exploded view showing additional details of the dissolving cup according to this embodiment. The dissolving cup 120 includes a plurality of mounting locations for the cartridges, each with recessed tracks therein (shown in more detail in FIG. 12) and a plurality of walls 125. The walls direct and maintain water flow from a plurality of nozzles (located beneath nozzle caps 81), centrally located in the dissolving cup, so that water contacts chemical tablets at the bottom of the cartridges uniformly.

The dissolving cup includes a plurality of tapered (pencil-point shaped) pedestals 100, extending upwardly toward the top of the housing. The tapered pedestals are positioned to support the chemical tablets. The pointed shape of the pedestals minimizes the amount of surface area contacting the chemical tablets. By minimizing the surface area, the formation of undissolved chemical tablet columns during dissolution of the tablets is prevented and more uniform dissolution of the tablets is promoted. In addition, the feed rate is increased because the tablet dissolves faster when it is not supported above the water line by undissolved columns. Another result is that the other chemical tablets are less prone to swelling, because they are not fed moisture via the columns, and thus do not remain in the chemical feeder long enough to swell. In the event the chemical tablets do swell, the open front face design of the cartridge 90 reduces the likelihood that the tablets will become stuck in an upper region of the cartridge.

In other embodiments, different shaped pedestals may be utilized providing the surface area of the pedestals that contacts the tablets is limited to such an area that prevents the formation of columns.

The dissolving cup also includes a spout 82 at one end for directing water to the exit of the housing. The spout width and rate of water flowing into the inlet controls the height of water in the dissolving cup. As flow is increased, the water level in the dissolving cup increases. As the water level rises in the dissolving cup, the amount of the surface area of the chemical tablets that is contacted by the water increases.

Figure 9:
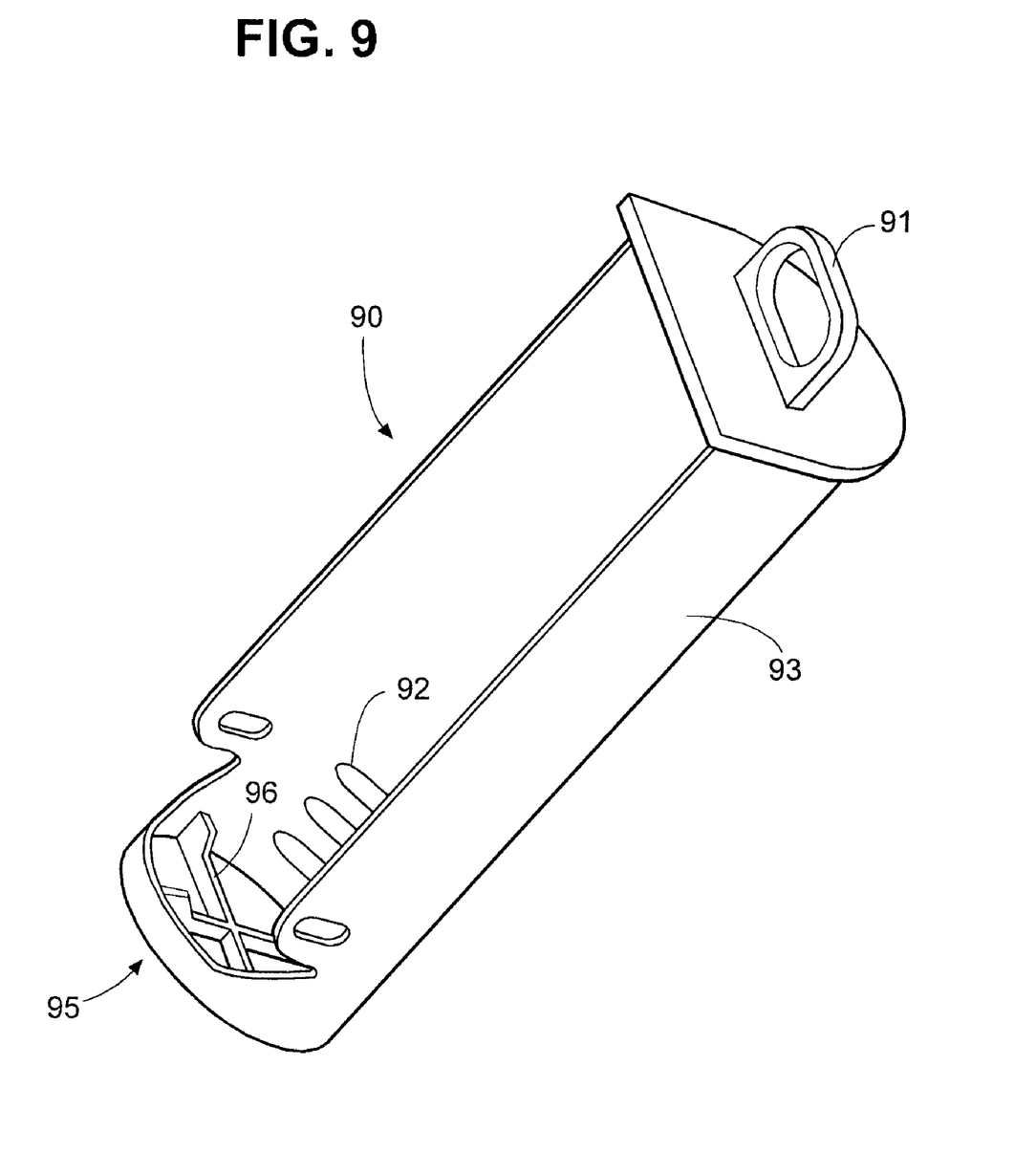
FIG. 9 illustrates a cartridge for holding chemical tablets, in accordance with the second embodiment of the disclosure.

FIG. 9 shows a cartridge 90 used with a chemical feeder according to this embodiment. The cartridge 90 is configured to be positioned in one of the plurality of subchambers via one of the cartridge openings 73. The cartridge includes a top portion having a handle 91. The top portion is typically supported by the cartridge support 72 when the cartridge is positioned in one of the plurality of subchambers of the housing. The cartridge includes sidewalls 93 that extend from the top portion and an open front face to a lower end. The open front face may accommodate either a round or D-shaped chemical tablet. The open front face allows for easy loading and positioning of the chemical tablets, thereby eliminating the need to drop the tablets in from the top and thereby reducing the risk of breaking and chipping tablets as they are loaded. The sidewalls have openings or slots 92 adjacent the lower end. The slots allow water to pass through all of the chambers in the dissolving cup and promote uniform contact of the water with the tablets. The cartridge includes a grid portion 95 at the lower end of the cartridge, attached to an end of the sidewalls as shown in FIG. 9. The grid portion is positioned within the dissolving cup when the cartridge is positioned in the housing and includes support members 96 that are positioned within the recessed tracks (best shown in FIG. 12) when the cartridge is positioned within the housing. The support members 96 aid in centering the chemical tablets and serve as a cradle to stabilize the tablets while they are lowered into the feeder. The grid portion 95 includes openings between the support members 96 for allowing the plurality of pencil point-shaped pedestals 100 to extend upwardly from the dissolving cup into the cartridge. In this way, the pencil point-shaped pedestals support the chemical tablets when the cartridge is positioned in the housing.

The partition 74 provides support for the chemical tablets on the open front face of the cartridge. The cartridge support 72 ensures that the cartridge is lowered to a proper depth in the chamber of the housing so that the grid portion 95 of the cartridge is recessed in the dissolving cup. The weight of the cartridge will hold it down since the chemical tablets are supported by the pedestals 100.

Figure 10:
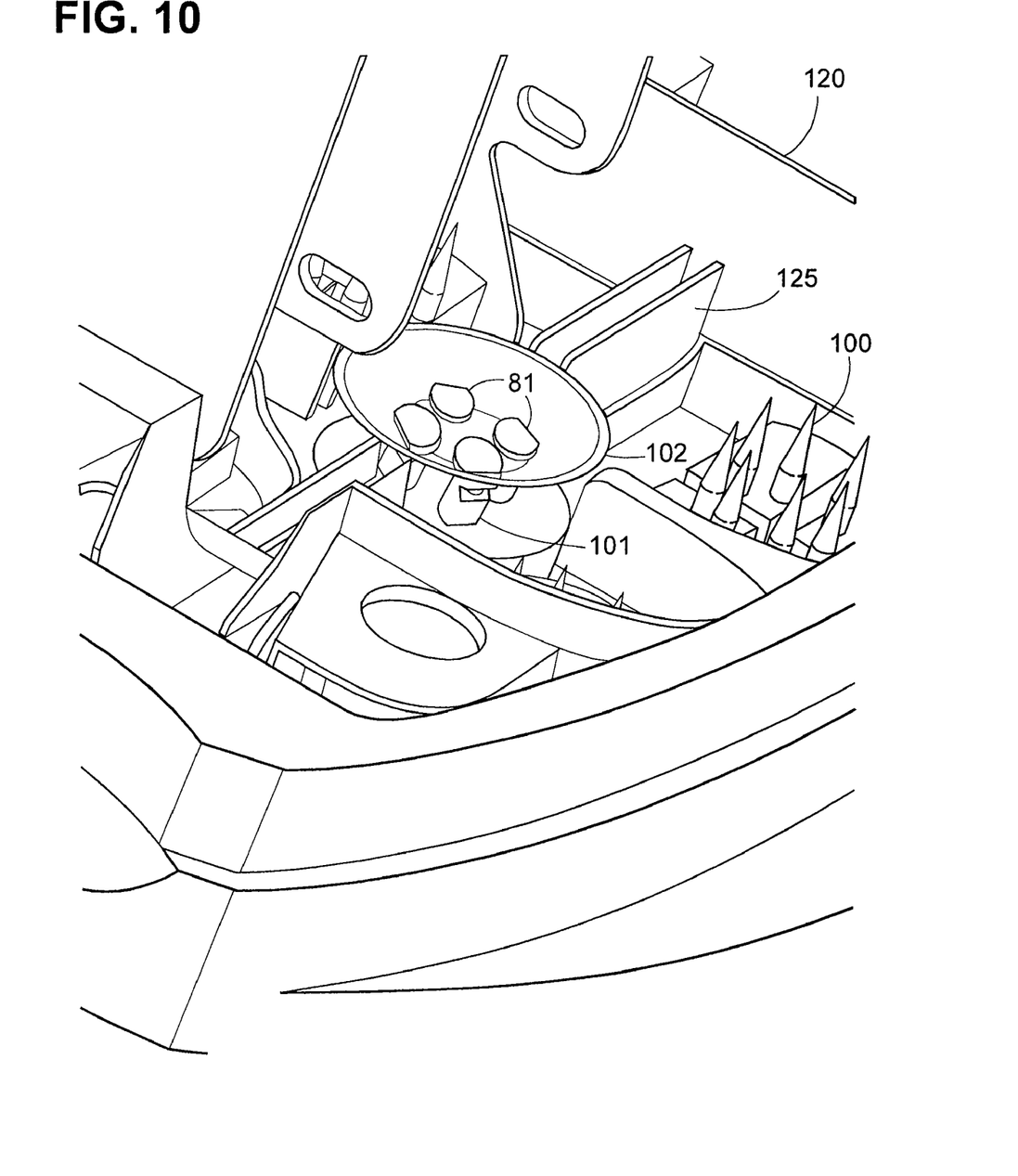
FIG. 10 is an enlarged partially exploded view of the interior of the apparatus in accordance with the second embodiment of the disclosure, showing a deflector installed above nozzles in the central portion of the dissolving cup.
Figure 11:
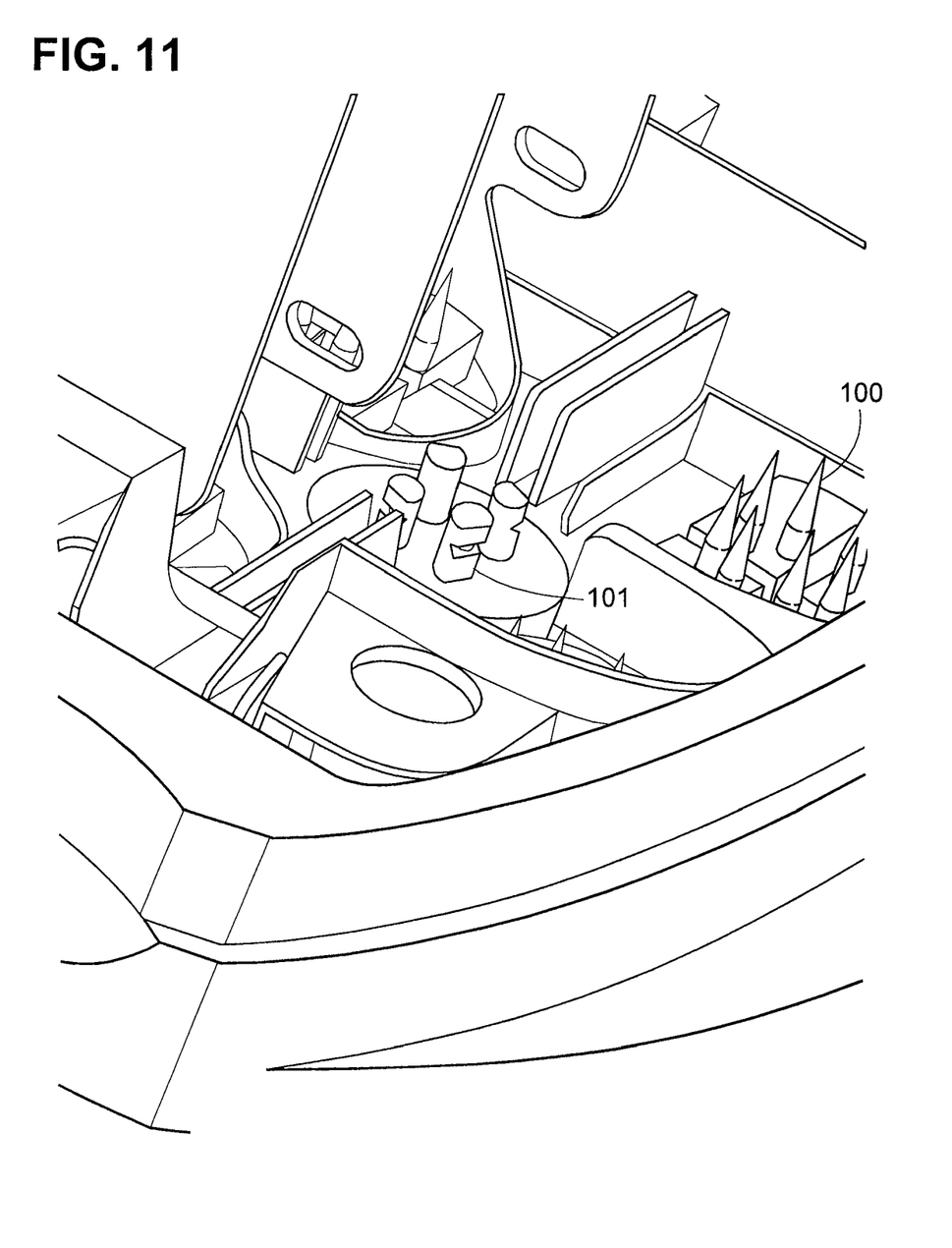
FIG. 11 is an enlarged partially exploded view of the interior of the apparatus in accordance with the second embodiment of the disclosure, showing the nozzles with the deflector removed.

FIGS. 10 and 11 show details of the nozzle assembly in accordance with this embodiment. A plurality of nozzles 101 are positioned within the dissolving cup for directing water entering the housing via the inlet. As in the first embodiment, the nozzles are generally oriented so that the water exits them at an angle substantially perpendicular to the housing sidewalls. A deflector 102 is positioned around and on top of the nozzles to deflect water exiting the nozzles toward the underside of the deflector and upwardly toward the underside of the chemical tablets. The deflector has an upwardly sloped wall so that the water exiting the nozzles is deflected upwardly along the underside of the deflector into the bottoms of the chemical tablets. The deflector is positioned over the nozzles 101, and nozzle caps 81 are formed in the surface of the deflector. The tops of the nozzles 101 are thus adhered to the nozzle caps of the deflector. The deflector prevents the water from the nozzle from rising too quickly and contacting the front of the chemical tablet, which could cause the tablet to tip forward. The deflector promotes even dissolving on the bottom of the chemical tablet.

Figure 12:
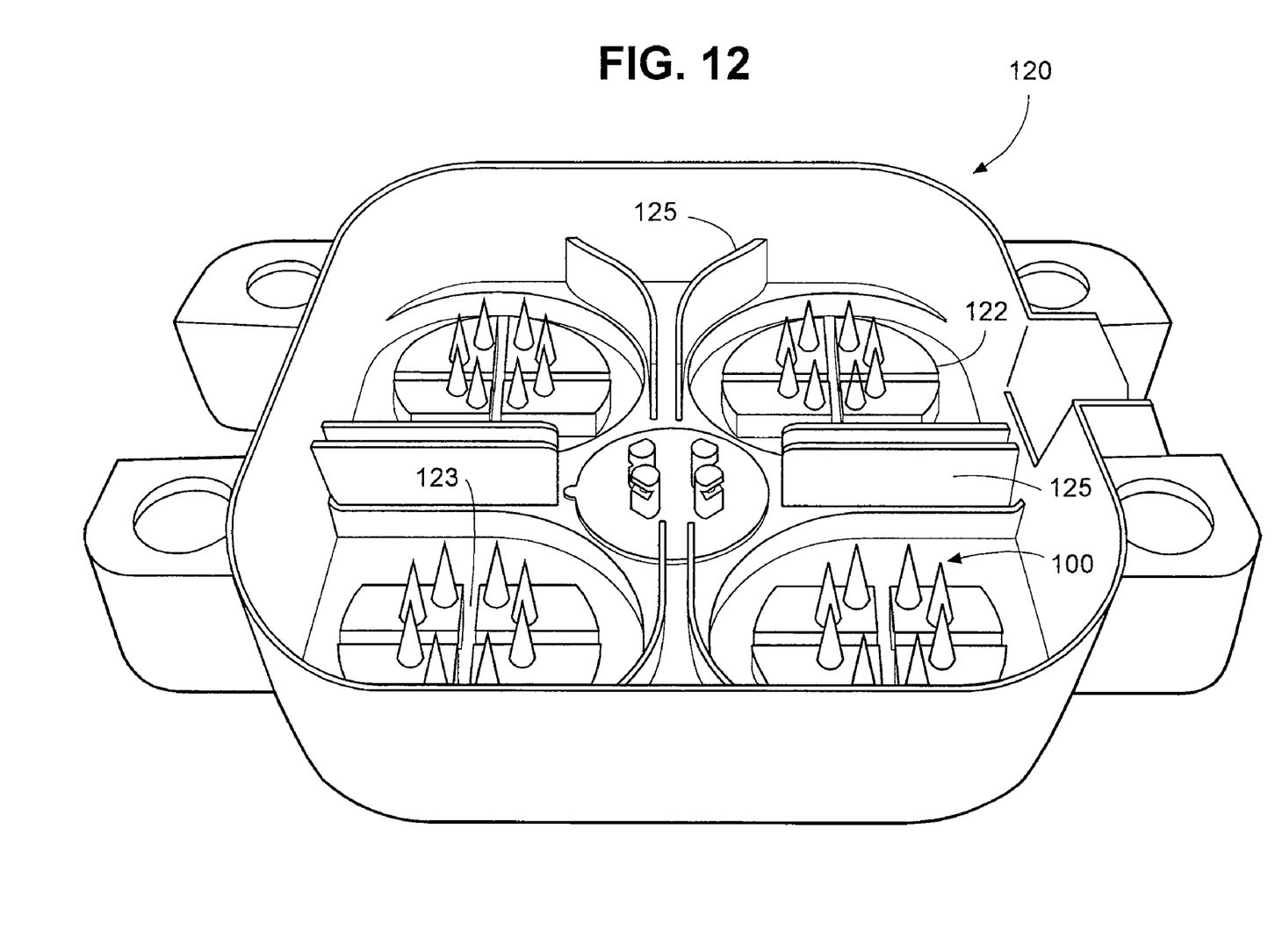
FIG. 12 illustrates the dissolving cup according to the second embodiment of the disclosure.

FIG. 12 is a perspective view of the dissolving cup 120 according to this embodiment. The partitions 125 define separate mounting locations for the individual cartridges and channels for conducting water. Four cartridges 90 may be mounted in dissolving cup 120. Each cartridge fits over a raised area 122 with the pedestals 100 pointing upward therefrom. Each raised area 122 has recessed tracks 123 therein, so that the support members 96 are positioned in the recessed tracks when the cartridge is installed. In this embodiment, the tablets are supported on the support members 96 of the grid portion 95 while the cartridge is lowered into the housing. As the cartridge is lowered onto the raised area 122 with pedestals 100, the support members 96 are lowered away from the tablets into the recessed tracks 123 while the tablets are supported by the pedestals 100 in the dissolving cup.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

I claim:

1. A chemical feeder for dissolving a chemical tablet in a liquid, comprising:
    a housing including an inlet and an outlet for allowing the liquid to flow in and out of said housing;
    a plurality of tapered pedestals positioned in the housing for supporting the chemical tablet as the tablet is dissolved by the liquid flowing through the feeder; and
    wherein each of said tapered pedestals has a pencil-point shape.

2. A chemical feeder according to claim 1, further comprising a cup configured to receive a cartridge for holding the chemical tablet, the cup including an inlet port and an outlet port for the liquid.

3. A chemical feeder according to claim 1, wherein the tablet is immersed in the liquid according to a height of the pedestals, so that a dissolution rate of the tablet corresponds to the height of the pedestals.

4. A chemical feeder according to claim 2, further comprising the cartridge, wherein
    the cartridge has an upper end and an opposing lower end for contacting the cup,
    the cartridge has a sidewall with an opening therein adjacent the lower end,
    the cartridge includes a plate disposed at the lower end, the plate having an exterior surface and an interior surface, and
    the plate has the tapered pedestals formed on the interior surface.

5. A chemical feeder according to claim 4, wherein, when the chemical tablet is installed in the cartridge and the cartridge is installed in the cup, the tapered pedestals are effective to support the chemical tablet and thereby expose an underside of the chemical tablet to the liquid.

6. A chemical feeder according to claim 4, wherein the plate is removable from the cartridge.

7. A chemical feeder according to claim 2, wherein the cup has partitions formed therein to define subchambers and channels for conducting the liquid, each of the subchambers sized to receive one cartridge.

8. A chemical feeder according to claim 2, further comprising
    a plurality of nozzles positioned within the cup for directing liquid entering the cup via the inlet port; and
    a deflector for deflecting liquid exiting the nozzles toward the underside of the chemical tablet, the deflector having a sloped wall.

9. A chemical feeder according to claim 2, wherein the tapered pedestals are disposed in the cup and extend from an interior surface thereof.

10. A chemical feeder according to claim 9, wherein the cup has partitions formed therein to define subchambers and channels for conducting the liquid, each of the subchambers is sized to receive one cartridge, and each of the subchambers has a set of tapered pedestals formed therein.

11. A chemical feeder according to claim 9, further comprising the cartridge, wherein
    the cartridge has an upper end and an opposing lower end for contacting the cup,
    the cartridge has a sidewall with an opening therein adjacent the lower end,
    the cartridge includes a grid portion disposed at the lower end, the grid portion having support members.

12. A chemical feeder according to claim 11, wherein the cup has a raised area with recesses therein and the tapered pedestals are disposed on the raised area so that, when the chemical tablet is installed in the cartridge and the cartridge is installed in the cup, the lower end of the cartridge surrounds the raised area and the support members are positioned within the recesses, and the tapered pedestals are effective to support the chemical tablet and thereby expose an underside of the chemical tablet to the liquid.

13. A chemical feeder according to claim 11, wherein the cartridge accommodates either a round or a D-shaped chemical tablet.

14. A chemical feeder according to claim 2, further comprising a cartridge support including a plurality of cartridge openings.

15. A chemical feeder according to claim 14, wherein the cartridge support includes a collar surrounding each opening and extending from the cartridge support, so that the collar encloses an upper end of a cartridge installed through an opening.

16. A chemical feeder according to claim 4, wherein the cartridge is sized to hold a plurality of chemical tablets.

17. A chemical feeder for dissolving chemical tablets in a liquid, said chemical feeder comprising:
    a housing having a closed bottom end, said housing defining a chamber sized to hold the chemical tablets, said housing including an inlet and an outlet for allowing the liquid to enter and exit the housing;
    a cartridge support positioned to support a cartridge at an upper end thereof, said cartridge support including a plurality of cartridge openings and a collar surrounding and extending from each opening toward the bottom of the housing;
    a dissolving cup positioned adjacent said bottom of said housing;
    a plurality of nozzles positioned within said dissolving cup for directing the liquid entering said housing via said inlet;

a deflector for deflecting the liquid exiting said plurality of nozzles toward the underside of the chemical tablet, said deflector having a sloped wall;

a cartridge sized to hold one or more chemical tablets and configured to be positioned in said chamber via one of said cartridge openings, said cartridge including an upper end having a handle and a lower end, said upper end being supported by the collar extending from said cartridge support when the lower end of said cartridge is positioned in said dissolving cup, said cartridge including a sidewall extending from said upper end to said lower end, said sidewall having an opening adjacent said lower end, said cartridge including a plate at said lower end, said plate having formed thereon a plurality of tapered pedestals extending upwardly toward said top of said housing, said tapered pedestals positioned for supporting the chemical tablets; and wherein each of said tapered pedestals has a pencil-point shape.

18. A chemical feeder for dissolving chemical tablets in a liquid, said chemical feeder comprising:

a housing having a closed bottom, said housing defining a chamber sized to hold the chemical tablets, said housing including an inlet and an outlet for allowing the liquid enter and exit said housing;

a partition defining a plurality of subchambers within the chamber;

a cartridge support including a plurality of cartridge openings;

a dissolving cup positioned adjacent said bottom of said housing, said dissolving cup having recessed tracks and a plurality of walls formed therein, said dissolving cup including a plurality of tapered pedestals extending upwardly toward a top of said housing, said tapered pedestals positioned for supporting the chemical tablets;

a plurality of nozzles positioned within said dissolving cup for directing the liquid entering said housing via said inlet;

a deflector for deflecting the liquid exiting said plurality of nozzles toward the underside of the chemical tablets, said deflector having a sloped wall;

a cartridge sized to hold one or more chemical tablets and configured to be positioned in one of said plurality of subchambers via one of said cartridge openings, said cartridge including a top portion having a handle, said top portion being supported by said cartridge support when said cartridge is positioned in one of said plurality of subchambers of said housing, said cartridge including sidewalls extending from said top portion and an open front face to an opposite end, said sidewalls having openings adjacent said opposite end, said cartridge including a grid portion at an end of said side walls opposite said top portion of said cartridge, said grid portion being positioned within said dissolving cup when said cartridge is positioned in said housing, said lower grid portion including support members positioned within said recessed tracks when said cartridge is positioned within said housing, said grid portion including openings between said support members for allowing said plurality of tapered pedestals to extend upwardly from said dissolving cup into said cartridge thereby supporting the chemical tablets when said cartridge is positioned in said housing; and wherein each of said tapered pedestals has a pencil-point shape.

* * * * *